United States Patent [19]

Soltsien

[11] 3,909,794

[45] Sept. 30, 1975

[54] METHOD OF STORING CONTROL DATA UPON THE INTERRUPTION OF A PROGRAM IN A PROCESSING SYSTEM

[75] Inventor: Kay Soltsien, Munich, Germany

[73] Assignee: Siemens Aktiengesellschaft, Munich, Germany

[22] Filed: Mar. 15, 1973

[21] Appl. No.: 341,572

[30] Foreign Application Priority Data

Mar. 23, 1972 Germany ........................... 2214240

[52] U.S. Cl. ........................................ 340/172.5

[51] Int. Cl. ........................................ G06f 9/18

[58] Field of Search ..................... 340/172.5; 444/1

[56] References Cited

UNITED STATES PATENTS

| | | | |
|---|---|---|---|
| 3,309,672 | 3/1967 | Brun et al. | 340/172.5 |
| 3,373,408 | 3/1968 | Ling | 340/172.5 |
| 3,440,619 | 4/1969 | Lehman et al. | 340/172.5 |

*Primary Examiner*—Gareth D. Shaw
*Assistant Examiner*—John P. Vandenburg
*Attorney, Agent, or Firm*—Schuyler, Birch, Swindler, McKie & Beckett

[57] ABSTRACT

A method is described for storing the contents of control registers when it is necessary to interrupt a program being processed in order to process a higher priority program. A usage register is provided for the general purpose registers in a program control unit, each general purpose register being assigned a stage of the usage register. The state of each stage of the usage register indicates whether the corresponding general purpose register is occupied with processing a program. When the latter program is interrupted, the contents of the usage register, the basic registers and the general purpose registers being used for processing the interrupted program are written into storage. Thus, only the contents of the previously employed general purpose registers need be read out of storage after the higher priority program is completed.

5 Claims, 1 Drawing Figure

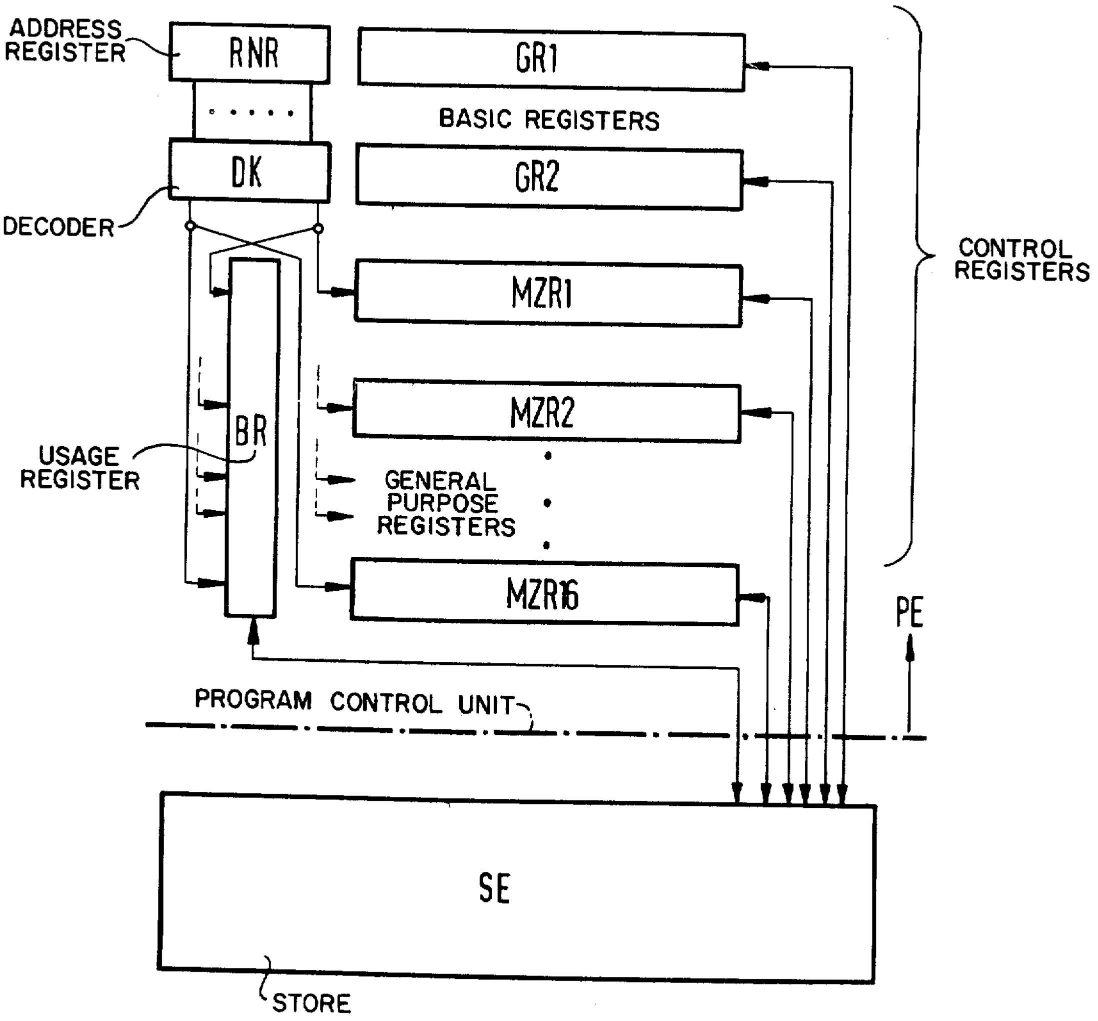
ADDRESS REGISTER
RNR
GR1
BASIC REGISTERS
DK
GR2
DECODER
CONTROL REGISTERS
MZR1
MZR2
BR
USAGE REGISTER
GENERAL PURPOSE REGISTERS
MZR16
PE
PROGRAM CONTROL UNIT
SE
STORE

METHOD OF STORING CONTROL DATA UPON THE INTERRUPTION OF A PROGRAM IN A PROCESSING SYSTEM

BACKGROUND OF THE INVENTION

This invention relates to a method for storing the contents of control registers in a data processing system, upon the interruption of program flow information, by means of a program request of higher priority in a processing system comprising processing units and a central storage.

It is known in data processing technology to interrupt currently operating programs in a processing system through program requests of higher priority. For example, the method described in West German Pat. No. 1,300,138 begins with the concept of dividing the program requests delivered to the processing system into particularly urgent short-term programs and normal-time programs of lower priority. The short-term programs and the normal-time programs are each processed in a separate processing unit, priorities being allocated to the individual programs according to which the particular program requests are completed consecutively. In this system, the capability of an ongoing program to be interrupted by a program request of higher priority is only provided in normal-time programs.

It is known to provide a system in which (Cf. U.S. continuation application 416,819 filed Nov. 19, 1973, an interrupt ceiling is controlled during a program flow, so as to allocate a separate priority to each of the time intervals of an operating sequence. Thereafter, a program flow can only be interrupted by a program request whose priority is higher than the priority of the ongoing program, and also higher than or equal to the priority of the program interval currently being processed.

Should a program be interrupted, it is important to have available the data controlling the currently operating program flow in order to start the program again. Thus, the data must be stored intermediately. In systems of known construction this is achieved in that upon the interruption of a program the data held in separate control registers are written into a separate area of the central storage.

Some of the control registers are basic registers, e.g., instruction counting registers, which are required in all programs and program intervals, and the other control registers are general-purpose registers, the use of which depends on the currently operating program or program interval. Consequently, the control registers are not always fully seized. Nevertheless, in the systems of known construction the contents of all the control registers are stored upon the interruption of a program.

An object of the invention is to provide an operating mode for systems of this type whereby they can store only the contents of the control registers used by the program to be interrupted when a program is interrupted, so as to save storage cycles.

SUMMARY OF THE INVENTION

In accordance with the invention, the foregoing and other objects are achieved in that a usage register is allocated to the general-purpose registers into which, if a general-purpose register is employed during a program flow, a usage bit is written. Upon the interruption of a program flow, aside from the contents of the usage register and the basic registers, only the contents of the general-purpose registers which are characterized as utilized by a bit in the usage register are written into the central storage. Conversely, upon restarting an interrupted program flow only the contents of the previously used general purpose registers are read out.

In an advantageous embodiment of the invention the bits of the usage register allocated to the individual general-purpose registers are set by instructions which cause the general-purpose registers to operate. In addition, there is the possibility of setting the usage bits directly by means of special instructions. The usage register is always cleared when a program is restarted. Furthermore, individual usage bits can also be erased during a program flow in conjunction with special instructions, e.g., transfer of the contents of a general-purpose register to the storage, or also through direct instructions.

A substantial advantage of the method in accordance with the invention lies in the fact that when a program flow is interrupted and when it is restarted storage cycles for the general-purpose registers, not employed at the time of the interruption, are saved.

BRIEF DESCRIPTION OF THE DRAWING

The principles of the invention will be more readily understood by reference to the description of an exemplary embodiment of a data processing system in which the method of the invention can be employed given hereinbelow in conjunction with the accompanying drawing. The single FIGURE of the drawing is a block-schematic diagram of a data processing system capable of performing the method of the invention.

DETAILED DESCRIPTION OF THE DRAWING:

The drawing shows in the form of a block diagram several control registers GR, MZR, a usage register BR and, as central storage unit of the processing system, a storage SE. The control registers and the usage register are incorporated in the program control unit PE, which represent a particular processing unit within the processing system.

The data processing system described herein, and the above-mentioned components of it, are of known construction, and they are described in a manner as to only provide sufficient details of their construction necessary to permit enablement to practice the invention. No particular construction of the system or its components is essential to the practicing of the invention.

The program control PE is described in detail in commonly assigned U.S. application Ser. No. 104,275 now U.S. Pat. No. 3,710,029. The latter application describes a program control unit constituted by a plurality of general purpose registers and basic registers. The latter registers are used in processing every instruction, while the former are used only as necessary. The registers themselves are conventional and are constructed from pluralities of binary switching stages. The other registers described herein are of similar construction.

Storage unit SE may be constructed according to the description of a similar such unit in commonly assigned U.S. application Ser. No. 61,692 now U.S. Pat. No. 3,792,439.

When a program is processed in a processing unit, the program flow is controlled by the program control unit PE. The data required for this purpose are transferred from allocated areas of the storage SE to the control registers GR, MZR. With reference to the control registers, they are basic binary registers of the type required to handle program information. They are shown in the drawing as, for example, two registers GR1, GR2, and sixteen general-purpose registers, MZR1, MZR2 to MZR16, the use of which depends on certain conditions. Thus, while the basic registers are needed in every program flow, such as, for example, the instruction counting register, the general-purpose registers serve only for receiving updated units of information during programmed operating sequence areas.

Upon the interruption of a program by a program request of higher priority, the problem is to be able to restart the interrupted program after the program request of higher priority has been processed and to maintain the continuity. To achieve this purpose, the data required for the control of the program and held in the control registers are written into areas of central storage SE allocated to the priority of the program to be interrupted. When the program is restarted, these control data are transferred back to the control registers, so that, subsequently, the previously interrupted program flow can be continued.

Since during a program flow only the basic registers are continuously seized by the control registers and only part of the general-purpose registers MZR normally are occupied with control data of the currently operating programs, according to the principles of the invention, upon the interruption of a program only the contents of the control registers actually being used by the program to be interrupted are written into the storage.

That is, the contents of all of the control registers are not stored, but only the contents of those registers then being used for processing program information.

This is accomplished by the invention in that a usage register BR is allocated to the general-purpose registers MZR. In so doing, each bit in the usage register BR corresponds to the degree of usage of a general-purpose register MZR. This means that when a given general-purpose register MZR is used or not used by the currently operating program, the bit in the usage register BR allocated to that particular register MZR is set or not set. The setting of the usage bit in the register BR occurs advantageously in conjunction with the control instructions of the ongoing program which cause the general-purpose registers MZR to operate, so that no separate instructions are required for this purpose. The selection of the general-purpose registers MZR and the corresponding bit locations in the usage register BR occurs through binary-coded addressing in an address register RNR and a following decoder DK of known construction.

The contents of the usage register BR are always an indication as to which general-purpose registers MZR are currently being used or not being used. Should the program be interrupted, only the contents of those general-purpose registers MZR that are characterized in the usage register BR by a set bit as being utilized are stored. Moreover, upon the interruption of a program, the contents of the usage register BR are written into the storage SE and transferred back when the program is restarted. This is significant in that prior to restarting a program the contents of the usage register BR are erased so as to release the register BR for the new program.

According to the foregoing, a usage bit is set in the register BR if a program instruction causes the corresponding general-purpose register MZR to operate, and it is erased if the program is interrupted or completed.

If a general-purpose register MZR is only used in a certain area within or at the beginning of the program, the corresponding usage bit in the register BR remains set until the end of the program. To avoid this, it is possible, according to a further development of the invention, to erase the particular usage bit in the register BR in conjunction with specified program instructions which characterize the end of the usage of a general-purpose register MZR within a program flow. Such a program instruction which erases a usage bit may be on hand during the transfer of the data from a general-purpose register MZR to the storage SE. Should in such a case the particular general-purpose register, nevertheless, not be released for use, because the contents of said register are needed in the further flow of the program, this program instruction is provided with a stop condition which, for example, may be contained in the instruction code.

The invention is not limited to only indirectly setting or erasing the usage bit in conjunction with program instructions, but it is also possible, in case of need, to set or erase the usage bit through separate instructions.

The method of the invention is described hereinabove in the context of its application to a specific data processing system. However, it is to be noted that the method can be applied to a wide variety of data processing systems of differing construction. Further, the method described hereinabove can be modified or changed, while remaining within the scope of the invention, as defined by the appended claims.

I claim:

1. In a data processing system having processing units, storage means and program control means, said program control means comprising basic registers and general-purpose registers, a method for retaining the contents of the program control registers when a program being processed is interrupted by a higher priority program, comprising the steps of:

indicating whether each of said general-purpose registers is being utilized for the program being processed by the state of a corresponding stage in a usage register means, said usage register means comprising a plurality of binary stages with each said stage being assigned to a given one of said general-purpose registers, transferring, upon interruption of the program being processed, the contents of said usage register means, said basic registers and those of said general-purpose registers indicated as being utilized by said usage register means to said storage means and reading from said storage means, upon resuming the program being processed, prior to interruption with respect to said general-purpose registers, only the contents of those of said general-purpose registers previously utilized.

2. The method defined in claim 1 comprising the further step of:

setting, by means of an instruction, a bit in said usage register means for causing the corresponding one of said general-purpose register means to operate.

3. The method defined in claim 1 comprising the further step of:

upon the transfer of the contents of a given general-purpose register to said storage means, erasing the bit in said usage register means corresponding to said given general-purpose register.

4. The method defined in claim 3 wherein said erasing step is prevented by supplying a stop condition in the instruction causing said given general-purpose register to execute said transfer step.

5. The method defined in claim 1 wherein the seizing or releasing of a said general-purpose register means and thereby the setting or erasing of the corresponding bit in said usage register means occurs directly through a separate instruction.

* * * * *